UNITED STATES PATENT OFFICE.

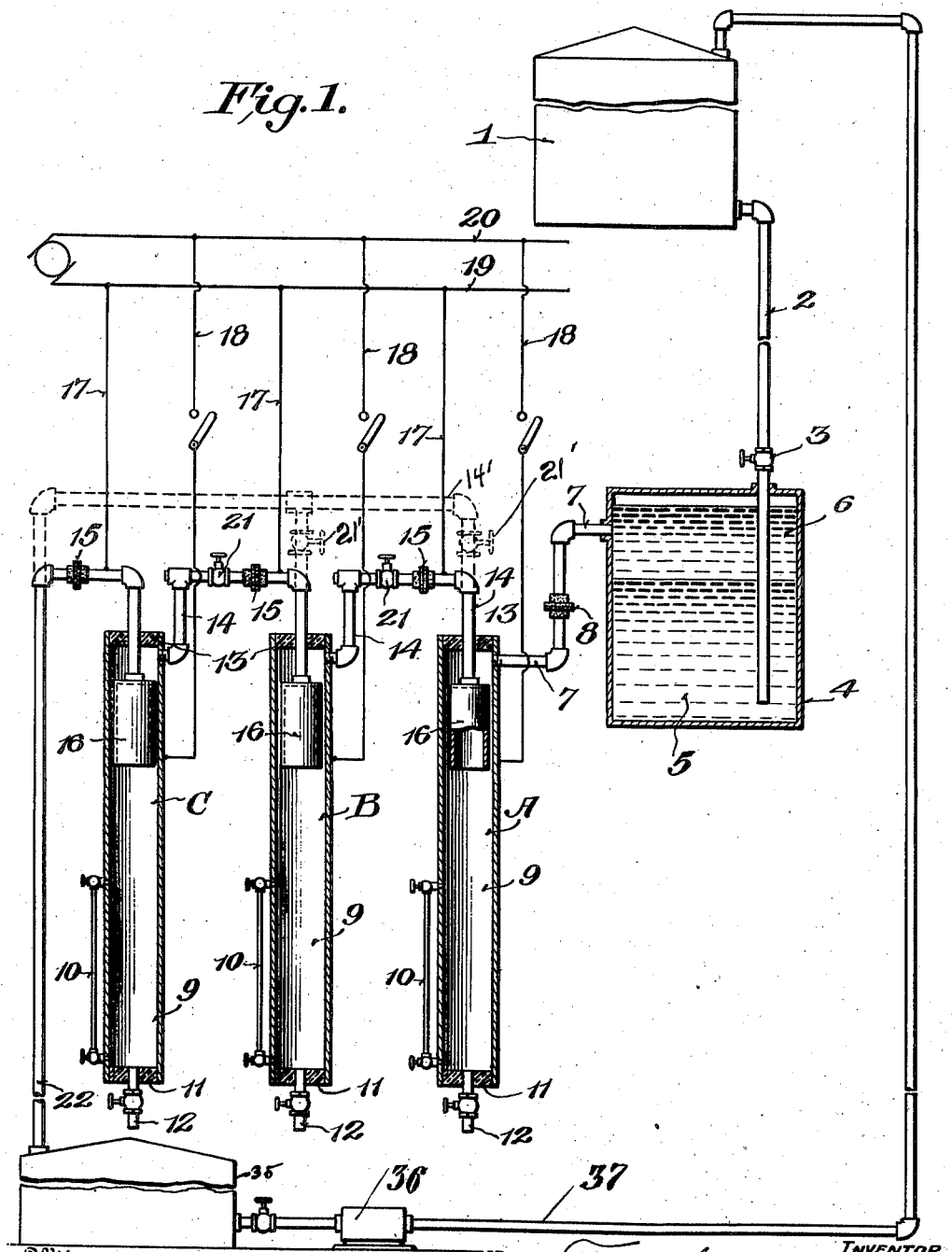

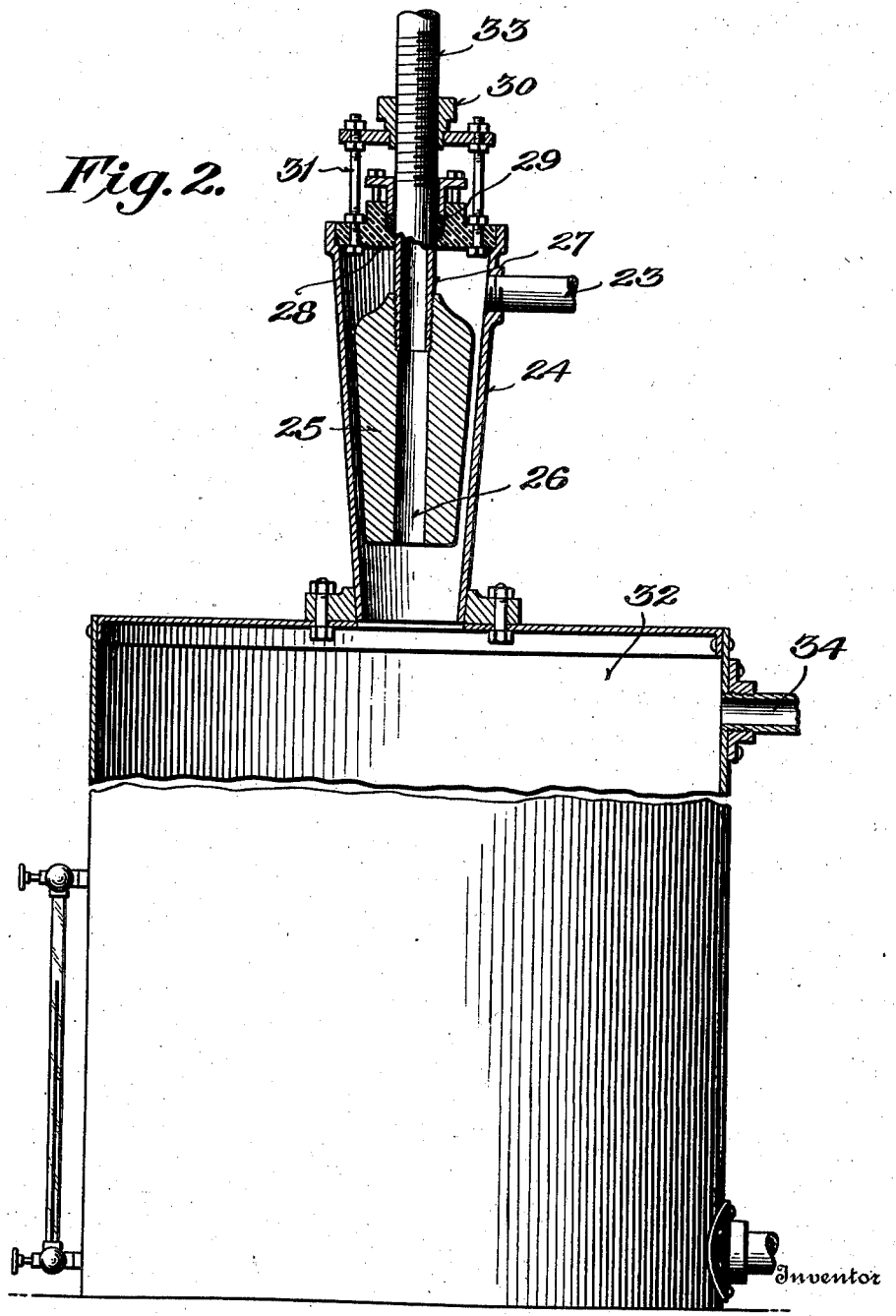

FRANK M. SEIBERT AND JOHN D. BRADY, OF HOUSTON, TEXAS, ASSIGNORS TO GULF PRODUCTION COMPANY, OF BEAUMONT, TEXAS, A CORPORATION OF TEXAS.

PROCESS OF AND APPARATUS FOR TREATING OIL.

1,290,369.   Specification of Letters Patent.   Patented Jan. 7, 1919.

Application filed January 11, 1918. Serial No. 211,386.

*To all whom it may concern:*

Be it known that we, FRANK M. SEIBERT and JOHN D. BRADY, citizens of the United States, and residents of Houston, in the county of Harris and State of Texas, have invented certain new and useful Improvements in Processes of and Apparatus for Treating Oil, of which the following is a specification.

This invention relates to processes of and apparatus for treating oil; and it comprises a method of separating or breaking the permanent emulsions of oil, watery liquid and mineral matter occurring in the crude oil from petroleum wells wherein such emulsion is passed in a thin layer between a pair of electrodes maintained of opposite polarity by a source of direct current and spaced such a distance apart as to prevent any substantial flow of current therebetween, oil being removed at a point just beyond the electrodes and such oil being then retreated in the same manner if necessary; and it further comprises as a new assemblage of apparatus elements, a pair of relatively short and small electrodes, means for feeding oil emulsion therebetween, means just beyond the electrodes for tapping off the oil separated in the passage of the emulsion, means at a more remote point for removing separated water and a source of direct current of relatively high voltage, say, 250 to 500, connected to such electrodes; all as more fully hereinafter set forth and as claimed.

In the operation of oil wells and pipe lines the presence of emulsified water and mud in the oil is a source of nuisance and loss. Such an emulsion is delivered by many wells in greater or less quantity and it is a difficult material to treat or handle. The water contained is usually in the form of a saline solution containing more or less salt, but in spite of the fact that usually salt solutions and oil emulsify even less readily than water and oil, this type of emulsion is quite permanent; it is difficult to break it by ordinary means. The reason for this permanency of character is not known; it may be due to something in the water or in the oil or it may be due to the mineral matter (mud). Heat alone does not cause an efficient separation and distillatory treatment aside from the cost of evaporating the water is impracticable because of bumping (explosive boiling), and because of the clogging of apparatus of the type of those ordinarily used in refining petroleum. It is desirable that all saline solutions and inorganic matters be removed before distillation is started. Sedimentation and scaling otherwise occur, causing heat losses, etc. No cheap chemical process of breaking the emulsion is known. The use of high voltage alternating currents has been proposed and is effective with some of these emulsions but not with all; but the complicated and delicate apparatus required renders an installation unduly costly.

We have found that we can produce an efficient and clean separation or breaking by electrical means with only a nominal consumption of power by utilizing what is known as cataphoresis—the tendency of mixed fluids, or of fluids containing suspended solids, to separate with different components streaming in opposite directions when exposed to a pair of electrodes of opposite polarity. The phenomenon is not due to electrolysis; and may or may not be accompanied by electrolysis. We have found that the emulsion occurring in the oil when so exposed to an electric current tends to part in this manner with separation of oil and of water (and mud) at the two poles. This fact we utilize in the present invention.

The emulsion as it occurs in crude oil is a material of rather fixed composition. While an oil may contain varying percents of water and mineral matter, yet on standing there tends to settle out an emulsion containing about equal volumes of oil and of water (and mud). That is, while any given oil may contain less than its own volume of water (and mud) in suspension, say 10 per cent. or 20 per cent., yet it will separate on heating or on heating and standing, giving a layer of oil and a layer of this emulsion rich in water. It is this particular emulsion which is treated in the present invention. Where the oil contains but little emulsion a preliminary separation may be produced by heating and settling the oil or by the use of centrifugal force. The settled emulsion is then treated.

This emulsion when placed between two electrodes connected to a suitable source of direct current tends to separate, the oil going toward the one pole as a clear liquid carrying but little emulsion while the water streams toward the other. And in the present invention operation is in this manner. Inasmuch as the result of the separation is the production of a salt solution which is more or less conductive it is an object in the present invention to make a relatively short exposure of the emulsion to the influence of the electric field, discontinuing exposure as soon as a separation is effected. To this end the emulsion is caused to stream between a pair of electrodes suitably spaced apart, with diversion of the oil and the water at points immediately beyond the electrodes. The emulsion itself is a composite liquid of relatively high resistance, but as soon as separation is effected and bodies of water of sensible size have formed opportunity is afforded for a short circuit, this water as stated being a saline solution and having a relatively good conductivity. So, as stated, the exposure in the electric field is made relatively short; or in other words short electrodes are used and a rapidly flowing stream of emulsion passed between them. In this operation conduction of current or electrolysis to any substantial extent is not desired; partly because it is not useful in the present invention and is a waste of power and partly because any substantial passage of current would lead to corrosion of the electrodes and the development of undesired compounds in the oil. Electrolysis of a salt solution of course develops chlorin and this chlorin would be taken up by the oil where it is undesirable. The electrodes are therefore arranged at such a distance apart as will give a high resistance; a resistance, ordinarily, of 50 to 150 ohms. With such a resistance no substantial amount of current, say not more than 3 or 4 amperes, will pass between the electrodes in using direct current at usual voltages, say 250 to 500 volts. In order to secure the effects that are here desired there should ordinarily be a little passage of current but this should be in negligible amount. Voltages can be used as low as 100 volts but in so doing not much capacity can be secured in the apparatus; the separation becomes too slow with any convenient apparatus. With a 250 volt potential the action is quicker but the best results are secured at voltages between 400 and 600 volts, say with about 500 volts. With the ordinary type of emulsion sufficient resistance can be secured to substantially cut off the passage of current, even with a 500 volt difference in potential, with a spacing between the electrodes of half an inch or thereabout. Treating the emulsion in a rapidly flowing stream, this amount of clearance will give ample capacity for the separation of large amounts of emulsion per hour. If greater capacity is wanted the potential can be increased somewhat and a greater spacing of electrodes made; or a little additional salt or salt brine may be added to the emulsion with the result of also allowing the poles to be spaced somewhat farther apart. But for ordinary large sized apparatus we find that a pole spacing of about half an inch and with electrodes of, say, about 36 square inches effective area, good results are attained at about 500 volts. Such an apparatus will handle 40 barrels of emulsion per hour with a production of 20 barrels of oil and with a flow of current which is but nominal, say 3 to 5 amperes. The poles may be made of any convenient material or metal. Ordinary cast iron works very well and special irons, such as duriron, tantiron, etc., are not necessary. Copper, graphite, etc., may be used. Since the passage of current is restricted to the lowest possible amount any corrosion of the poles is concomitantly restricted. For this reason, as stated, any ordinary material may be used for the electrodes.

Ordinarily the oil containing more or less water is treated to produce a separation of what may be called rich emulsion. The oil so separated goes to any suitable point of use while the emulsion is next passed as a fairly rapid current between pole pieces under the conditions described. It is a useful expedient to first pass the emulsion through a body of somewhat stronger brine than the saline solution naturally contained in the emulsion. In so doing the separation is quicker. The emulsion, either with or without reinforcement of its saline strength, is passed between the poles in a heated condition. A temperature of 150° to 170° F. is a good temperature for the present purposes. On passing between the poles there is immediate separation of water and oil. The water escapes beyond the electrodes before any opportunity is afforded for forming a short circuit. It is aimed to divert the oil and the water as soon as separation occurs and remove them beyond the electric field. The water, or saline solution, carries with it the mud originally present in the emulsion but is substantially free from oil. It may be sent to waste. The oil may or may not be substantially freed from water at the time it is so diverted and removed; this depending somewhat upon the apparatus and the condition of operation. Ordinarily however it is sufficiently dry and pure to permit its direct distillation. The oil may however be passed through a similar apparatus whereupon another separation is obtained with removal of any remaining water and mud. The consumption of current in such a second separation is even smaller than that in the primary separation; say not more than 10 per cent. of the amount required in the primary separation.

It is found that a desirable type of apparatus for the present purposes may be secured by placing a short piece of pipe within a larger piece of pipe and insulated therefrom, in concentric relation. The outer pipe and the inner pipe are connected to suitable sources of direct current; usually a dynamo. The emulsion is passed between the inner and outer pipes where it is exposed to the action of the electric field. The oil that separates is immediately removed by means of the inner pipe while the water, or saline solution, and mud are drawn off from the bottom of the outer pipe. The apparatus as just described is concentric, it consists of two pieces of ordinary cylindrical pipe. It is sometimes convenient, for reasons stated ante, to be able to vary the resistance; and to this end there is sometimes used instead of a pair of cylindrical pipes two concentric members which are tapered or funnel-shaped and are adjustable with relation to each other. By moving the inner coned pipe or fitting a short distance the space between the poles can be adjusted and thereby the resistance. As stated, in the present invention it is an object to adjust the resistance in each case so that no substantial amount of current will pass through, securing as nearly as may be a purely cataphoretic effect. Passage of current in any amount not only means waste of power, corrosion and contamination of the oil, but it also leads to heating, generation of steam, etc.

The separation is very quick, clean and effective. As soon as the power is turned on the inflowing emulsion separates and a clear stream of oil begins flowing out. A rumbling noise is heard within the apparatus but there is no substantial development of heat and no substantial formation of gases and vapors.

In the accompanying illustration we have shown, more or less diagrammatically, certain combinations of apparatus elements within the purview of the present invention and susceptible of use in the performance of the stated process. In this showing Figure 1 is a view in central vertical section, certain parts being shown in elevation of a complete apparatus allowing successive treatments of emulsion and oil; and Fig. 2 is a fragmental sectional view of a modified form of treater.

In this showing, element 1 is a storage tank for emulsion. This emulsion may have been separated from oil as far as practicable elsewhere. The emulsion goes, as shown, through pipe 2 provided with valve 3 into brine tank 4, containing a body of strong brine 5. This strong brine serves to strengthen the saline content of the water in the emulsion. The use of this brine tank may be omitted but it is sometimes useful in dealing with refractory emulsions. The emulsion and brine are both at a temperature of, say, 150° to 170°. The emulsion rises through the brine to form layer 6 which flows through pipe 7 to the treating apparatus. This pipe contains an insulating bushing 8. As shown, the treating device consists of three similar pieces of apparatus A, B and C. Each comprises a pipe section 9 which may be, as stated, of ordinary cast iron pipe. It may be wrought iron or any other metal. No electrolysis being involved in the present invention as long as the material is conductive of current the particular metal used is not very material. As shown this pipe section is provided with gage glass 10. At the base it is closed by disk 11 of any suitable insulating material through which passes valved draw-off 12 for separated water or salt solution. At the top it is closed by a similar disk 13 of insulating material. Through this top closure passes pipe connection 14 provided with fiber bushing 15 for insulation purposes. A length of rubber or canvas hose may be substituted. At the lower end this pipe connection enters a larger piece of piping 16 open at the bottom. This piece of piping constitutes one electrode while the pipe section (9) previously described constitutes the other. As shown, they are spaced a short distance apart; the particular spacing depending upon the resistance of the emulsion. However ½-inch spacing with most emulsions will give a resistance of about 125 ohms so that with a 500 volt potential difference between the electrodes not more than 4 amperes will pass; a quantity of current which is wholly negligible so far as electrolysis or corrosion of the poles is concerned, but which is sufficient for the present purposes. If the spacing be less, say a quarter of an inch, it is necessary to have a corresponding smaller potential difference between the electrodes and the capacity of the apparatus will be cut down correspondingly. With an apparatus of the kind just described with the inner electrode 20 to 30 inches long and about 6 inches diameter with half an inch spacing between this inner electrode and the outer, about 40 barrels of emulsion can be passed through per hour. In passing between the two electrodes a quick and clean separation is effected and the salt water falls to the bottom of the outer pipe section whence it is drawn off. The oil and water separating in the narrow channel between the electrodes are carried forward to a point below the inner pipe section or electrode whence the oil streams upwardly into the interior of the inner electrode. With the speed of emulsion supply mentioned and the dimensions of electrodes stated there is no danger of short circuiting, the water separated or saline solution passing away below the inner electrode as fast as it is formed. If short circuiting should occur the speed of emulsion feed is simply increased somewhat to carry separated water forward. It is sometimes advisable in handling emulsions of irregular quality to put a resistance in the circuit to prevent such short circuiting. Current is furnished to the two electrodes by leads 17 and 18 from mains 19 and 20 respectively. The oil is separated from the emulsion more or less thoroughly in accordance with the speed at which the apparatus is run. Any number of separating apparatus may be used. In event one apparatus is used the valves 21 are closed and valve 21' leading from the first apparatus is opened, in which event separated oil flows through pipe 14' to pipe 22 and thence to tank 35. In event there is any emulsion in this oil it settles to the bottom and may be withdrawn by means of pump 36 and sent to storage tank 1 through pipe 37. In event two apparatus are to be used the valve 21' leading from apparatus A is closed and valve 21 is opened. Valve 21' leading from apparatus B is also opened with a result that oil separated in A is delivered to B through pipe 14 and thence after another separation in B is delivered to pipe 14', from whence it passes through pipe 22 to storage tank 35. In this event valve 21 on the pipe leading from apparatus B is closed. By proper adjustment of the valves the emulsion may be subjected to three separations, flowing through A where the main body of the mud and water is separated and thence to B where a more thorough separation is effected and thence to C, the separated oil flowing through pipe 22 into the storage tank.

The dimensions and rates of feed mentioned are merely illustrative and the voltage and the dimensions may be changed considerably within the purview of the present invention. The lower the voltage however the nearer must the poles be approximated and the slower can be the feed of liquid. For practical purposes we find that a 500 volt current, or between 400 and 600 as extremes, works best and with the usual type of emulsion the spacing and dimensions given are desirable.

The structure of Fig. 2 is somewhat different from that of Fig. 1. In this showing hot emulsion enters through 23 and passes down between opposite poles 24 and 25, the latter being the interior pole. As shown, both these elements are tapered but they have a somewhat different angle. The interior pole as shown is a cored iron casting with a central perforation 26. It is threaded on adjustably threaded pipe 27 passing through insulating bushing 28 and stuffing box 29. The threaded portion is engaged by nut 30 on yoke or standard 31. The water or saline solution separated in the passage between the electrodes passes downward into tank 32. The oil separated may be drawn off through the hollow threaded pipe (27) previously described at 33 or it may pass with the water down into the tank below and be drawn off at 34.

What is claimed is:—

1. In the separation of petroleum emulsions the process which comprises passing such an emulsion as a flowing stream between a pair of electrodes connected to a source of direct current and spaced sufficiently far apart to prevent passage of any substantial amount of current and separating and removing oil and water immediately beyond said electrodes.

2. In the separation of petroleum emulsions the process which comprises passing such an emulsion as a flowing stream between a pair of electrodes connected to a source of direct current giving a potential difference of 250 to 600 volts and spaced sufficiently far apart to prevent passage of any substantial amount of current and separating and removing oil and water immediately beyond said electrodes.

3. In the separation of petroleum emulsions the process which comprises passing such an emulsion as a flowing stream between a pair of electrodes connected to a source of direct current giving a potential difference of 400 to 600 volts and spaced sufficiently far apart to prevent passage of any substantial amount of current and separating and removing oil and water immediately beyond said electrodes.

4. In the separation of petroleum emulsions the process which comprises passing such an emulsion as a flowing stream between a pair of electrodes connected to a source of direct current giving potential difference of about 500 volts and spaced sufficiently far apart to prevent passage of any substantial amount of current and separating and removing oil and water immediately beyond said electrodes.

5. In the separation of petroleum emulsions the process which comprises imposing a constant potential difference on a pair of concentric electrodes from a source of direct electric current, the inner of said electrodes being shorter than the outer and passing a stream of petroleum emulsion between the two electrodes, the spacing apart of said electrodes, their active area and the resistance of said emulsion being so correlated that only a current of 3 to 5 amperes will pass between said electrodes.

6. In the separation of petroleum emulsions the process which comprises imposing a potential difference between a pair of concentric electrodes from a source of direct electric current, the inner of said electrodes being shorter than the outer and having an open bottom and the two being spaced sufficiently far apart to prevent free flow of current therebetween under the conditions of operation, passing a stream of hot petroleum emulsion between the two electrodes, removing oil through the inner electrode and removing water at the bottom of the outer electrode.

7. The process of separating petroleum emulsions which comprises heating such an emulsion, passing it upward through a strong brine, passing it between a pair of electrodes connected to a source of direct current, subjecting it to a cataphoretic separation without substantial amount of electrolysis and removing the separated oil and water.

8. In apparatus for separating petroleum emulsions a pair of concentric tubular electrodes, the inner being shorter than the outer, means for imposing a potential difference from a source of direct current upon the two electrodes, means for passing petroleum emulsion between the two electrodes, means for removing oil at the top of the inner electrode and means for removing separated water at the base of the outer electrode.

9. In an apparatus for treating petroleum emulsion, a source of direct current of about 500 volts potential, a pair of electrodes connected to said source and spaced about half an inch apart, means for passing a stream of petroleum emulsion between said electrodes, and means immediately beyond said electrodes for removing a stream of oil in one direction and a stream of separated water in another.

10. In an apparatus for treating petroleum emulsion, a source of direct current, a number of pairs of electrodes connected to said source, means for passing petroleum emulsion between one pair of such electrodes, means immediately beyond for diverting separated oil from residual water and means for passing the diverted oil between another pair of electrodes in like manner.

11. In an apparatus for treating petroleum emulsion, a brine tank, means for passing hot petroleum emulsion into the base of said tank, means for removing petroleum emulsion at the top, a source of direct current, a pair of electrodes connected thereto, means for passing the removed petroleum emulsion between said electrodes and means immediately beyond said electrodes for diverting separated oil from residual water.

12. In an apparatus for treating petroleum emulsion, a brine tank, means for passing hot petroleum emulsion into the base of said tank, means for removing petroleum emulsion at the top, a source of direct current, a pair of electrodes connected thereto, means for adjusting the spacing apart of said electrodes, means for passing the removed petroleum emulsion between said electrodes and means immediately beyond said electrodes for diverting separated oil from residual water.

In testimony whereof, we affix our signatures hereto.

FRANK M. SEIBERT.
JOHN D. BRADY.